(12) United States Patent
Lee et al.

(10) Patent No.: US 6,362,892 B1
(45) Date of Patent: Mar. 26, 2002

(54) SYSTEM FOR PROVIDING USEFUL SUMMARIZED SETTING INFORMATION FOR MULTI-LAYERED USER INTERFACE

(75) Inventors: Tian Chye Christopher Lee; Kian Hoe Kang, both of Singapore (SG)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/158,325

(22) Filed: Sep. 22, 1998

(30) Foreign Application Priority Data

Jan. 31, 1998 (SG) ............................................. 9800220

(51) Int. Cl.[7] .............................................. G06K 15/00
(52) U.S. Cl. ........................................ 358/1.13; 358/1.1
(58) Field of Search ........................... 358/1.1, 1.2, 1.9, 358/1.13, 1.14, 1.15, 1.16, 1.17, 448, 450, 530, 540; 710/8, 9, 14, 15, 16, 36, 40, 41, 52, 53, 56, 62, 72

(56) References Cited

U.S. PATENT DOCUMENTS 5,050,099 A * 9/1991 Nishihara ................... 358/1.8
5,459,826 A    10/1995 Archibald
5,819,014 A * 10/1998 Cyr et al. .................. 358/1.13

FOREIGN PATENT DOCUMENTS

EP          0814425         12/1997

* cited by examiner

Primary Examiner—Arthur G. Evans

(57) ABSTRACT

A system for providing useful summarized setting information is disclosed. The system comprises a memory of a computer and a printer driver. The computer has a display and is connected to a printer, while the printer driver provides a print setting multi-layered user interface (UI). The memory provides a means for the printer driver to store and retrieve a set of print setting data, which is representative of a previously selected permutation of printer features and setup options. When a user initiates a session to perform print setting operations, the printer driver retrieves the print setting data from the memory and presents the print setting multi-layered UI on the display. In addition to processing the print setting data to present the print setting data using the print setting multi-layered UI for the user to make changes, the printer driver also processes the print setting data to provide a summary bar. The printer driver then presents the print setting data as graphical and textual descriptions in the summary bar, which are otherwise hidden or too lengthy for the user to comprehend in the form presented in the print setting multi-layered UI.

20 Claims, 10 Drawing Sheets

SYSTEM FOR PROVIDING USEFUL SUMMARIZED SETTING INFORMATION FOR MULTI-LAYERED USER INTERFACE

FIELD OF INVENTION

The invention relates generally to computing systems provided with multi-layered user interfaces. In particular, it relates to a system for providing a user with useful summarized setting information for a multi-layered user interface using graphical and textual representations.

BACKGROUND OF THE INVENTION

The ubiquitous printer is a device generally connected to a computing system for producing hardcopies, or printouts, of source documents. These source documents are typically generated using common application programs like word processors, spreadsheets, or drawing tools that would usually be installed in the computing system. To afford the computing system with printing functionality, it additionally needs to be installed with a printer driver corresponding to the connected printer.

Due to rapid and progressive development of printer technology over the recent years, many types of printers have appeared at the marketplace. Of the numerous types of printers commercially available now, inkjet and low-cost laser printers have become popular with many cost-conscious computer system owners. These computer system owners, however, have also evolved into sophisticated users. Hence, for a manufacturer of such types of printers to further distance itself from the competition in the crowded marketplace, it would need to additionally implement new useful printer features in each new type of printer.

One such inkjet printer offering new useful printer features is the HP Deskjet 1100C Printer from the Hewlett-Packard Company. The 1100C Printer is provided with, among other special printer features, a Handout feature. A user who chooses such a feature is given an opportunity to reduce the size of two, four or eight pages of a document and print these pages onto a single sheet of printout. The effect of such a feature can be seen in FIG. 1, where seven pages of a document are printed using the Handout feature to produce two sheets of printout.

Such printer features are optimally implemented in a printer driver, where these features are accessible to all the application programs in a computer system through the operating system. Moreover, with an expanding knowledge base for software programming and the availability of low-cost software production, printer drivers have now arrived at a state whereby users can opt for one of but many printer features available in each printer driver.

While such multi-feature printers are widely available and used, they suffer from disadvantages. With the addition of such new useful printer features to the printer drivers, thereby increasing the versatility of the printers, the complexity of these printer drivers have also increased manifold. What was earlier a simple act of selecting one of a few traditional printer setup options, such as the size and type of media on which a desired printout is made, is now a complicated process of choosing one of many different permutations of printer features and these traditional printer setup options. This process of choosing a permutation of printer features and setup options is usually done with a print setting user interface implemented in the printer driver. An important disadvantage addressed by the present invention is that a user selecting a printer features and setup options permutation nowadays will typically be confounded by and unsure of the effect that the selected permutation will have on a desired printout. This confusion and uncertainty arises because the user typically does not get sufficiently accurate information on the effect the printer features and setup options has on the desired printout. "Help" functions provided by the printer driver also do not alleviate the problem since they usually provide lengthy descriptions of the print features and setup options, which are time-consuming to read and difficult to comprehend.

In addition, and more importantly, the print setting user interface is also typically implemented through means of a multi-layered user interface, whereby dialog boxes and tabs are used as shown in FIG. 2A. FIG. 2A shows the "Setup", "Colour" and "Features" tabs available in the print setting user interface of the printer driver for the HP Deskjet 1100C Printer. The use of such a print setting multi-layered user interface results in the dispersion of printer features and setup options among the various dialog boxes and tabs. The top-most tab or layer always hides the lower layers and thereby render the print setting in those lower layers hidden from the view of the user, as shown in FIG. 2A. Therefore, the user would have to commit to memory the selected printer features and setup options permutation in order to correlate the effect of the print setting on the desired printout.

Various solutions to these problems have been proposed and made available in the marketplace. For example, the HP Deskjet 1100C Printer print setting multi-layered user interface uses a graphical image, for example bitmap B as shown in FIG. 2A, to represent a special printer feature, Booklet. A single bitmap is, however, static, inflexible, and not sufficient to represent the many possible permutations in the print setting multi-layered user interface. On the other hand, keeping a large cache of bitmaps for the many possible permutations is also not practical as the task of maintaining such a cache increases the disk usage requirements significantly.

A method of representing each permutation with multiple bitmaps is also used. However, this method requires more effort from the user in that the user has to view each individual bitmap separately before attempting to piece the various pieces of information together to visualize the effect of each permutation on the desired printout. The user may also spend more time guessing the effect of each permutation on the desired printout if the permutations are not accurately represented by the bitmaps. For example, the relative dimensions between a source document and its corresponding desired printout is not accurately represented in such solutions. Such solutions also do not preserve the aspect ratio of the source document and the corresponding desired printout. The changes in aspect ratio due to, for example, media size selections or document orientation change, are not reflected in the bitmaps representations of such solutions.

The print setting multi-layered user interface and its use of tabs, as mentioned above, hides most of the information available in the layers below the top-most layer from the user. The HP Deskjet 1100C Printer attempts to alleviate such a problem by showing the bitmap B which represents the Booklet feature selected in the hidden lower Feature layer, in the current top-most Setup layer as shown in FIG. 2B. However, this solution also bears the same limitations inherent with the use of bitmaps as described above. Moreover, only the bitmap representation of the selected special printer feature is shown to the user. The information provided by the bitmap B is therefore of little use and insufficient to the user who is trying to visualize the effect of the different permutations of printer features and setup options on the desired printout.

Accordingly, it is an object of the present invention to provide a system for providing a user with useful summarized setting information for a multi-layered user interface using graphical and textual representations.

SUMMARY OF THE INVENTION

A computing system having a multi-layered user interface for providing setting functionality is provided with a system for providing a user with useful summarized setting information. A set of setting information is stored in a memory, which is used by the multi-layered user interface for providing the setting functionality. The setting information is updated whenever the user performs a setting function. The setting information is also made accessible for interpretation and reorganization, the result of which is subsequently presented on a display of the computing system for providing the useful summarized setting information.

In a preferred embodiment of the invention, the useful summarized setting information is juxtaposed with the multi-layered user interface. In addition, the useful summarized setting information includes graphical and textual representations of the setting information. Furthermore, the graphical representations are prepared by a vectored drawing approach. The graphical representations are also prepared by a layered drawing approach.

BRIEF DESCRIPTION OF THE DRAWINGS

The invention will be better understood with reference to the drawings, in which.

DETAILED DESCRIPTION OF THE PREFERRED EMBODIMENT

Figure 1:
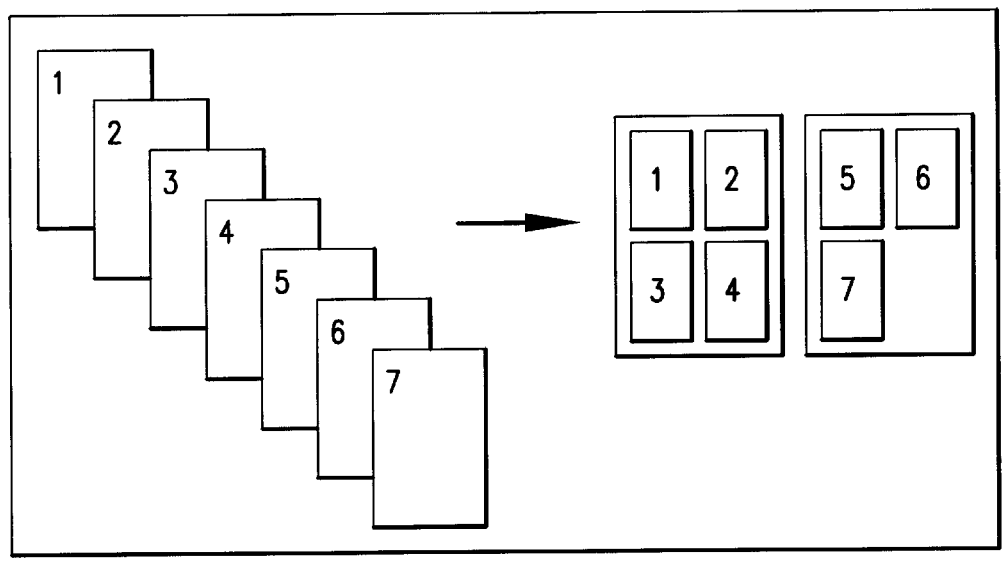
FIG. 1 shows the effect of a special printer feature, Handout 4×4, on a source document using the prior art printer driver for the HP Deskjet 1100C Printer.
Figure 2A:
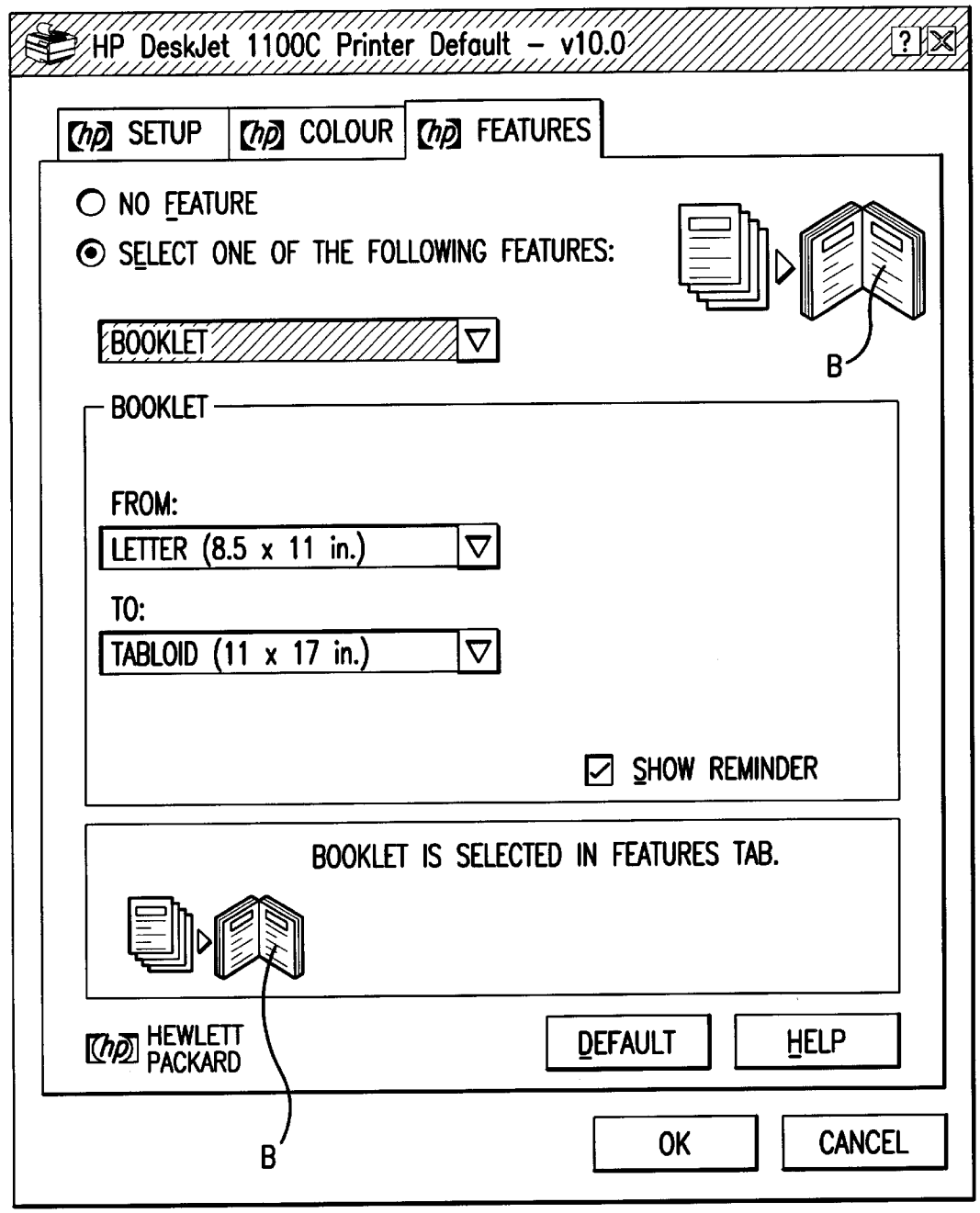
FIG. 2A shows a print setting multi-layered user interface of the printer driver in FIG. 1, with the Features layer as the top-most layer.
Figure 2B:
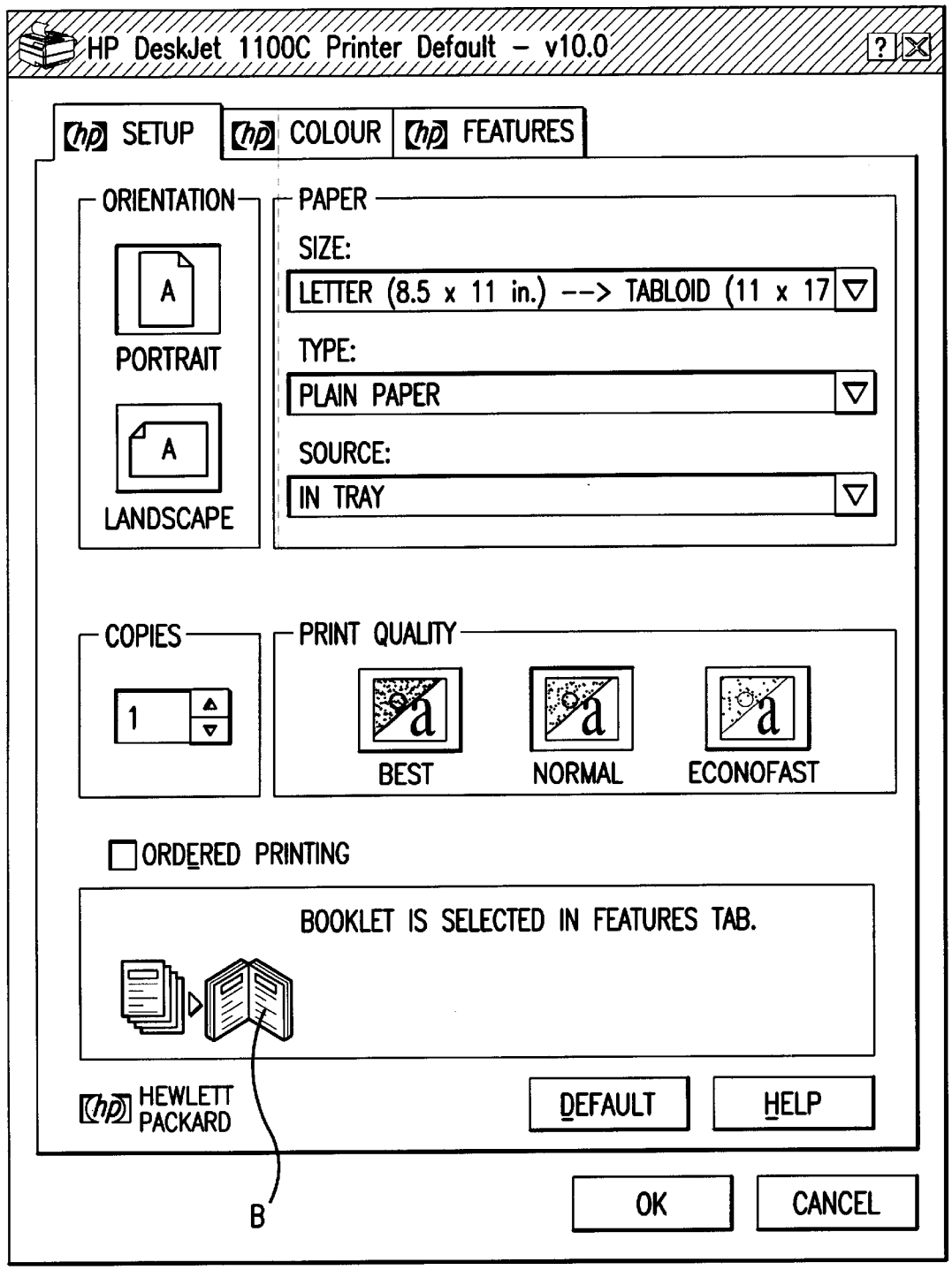
FIG. 2B shows the print setting multi-layered user interface in FIG. 2A with the Setup layer as the top-most layer.
Figure 3:
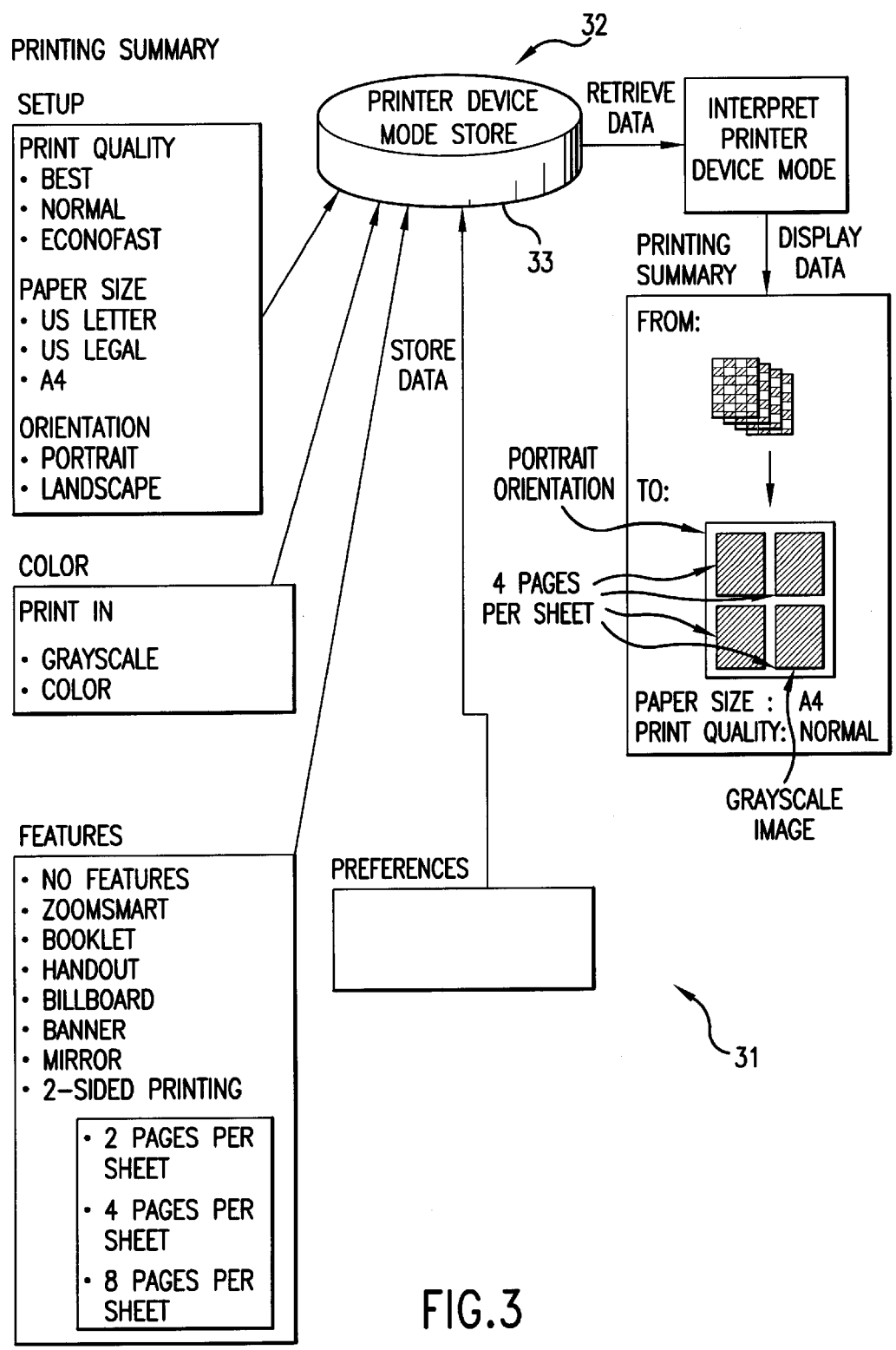
FIG. 3 shows a block diagram of a system for providing a user with useful summarized setting information for a multi-layered user interface according to a preferred embodiment of the invention.
Figure 4A:
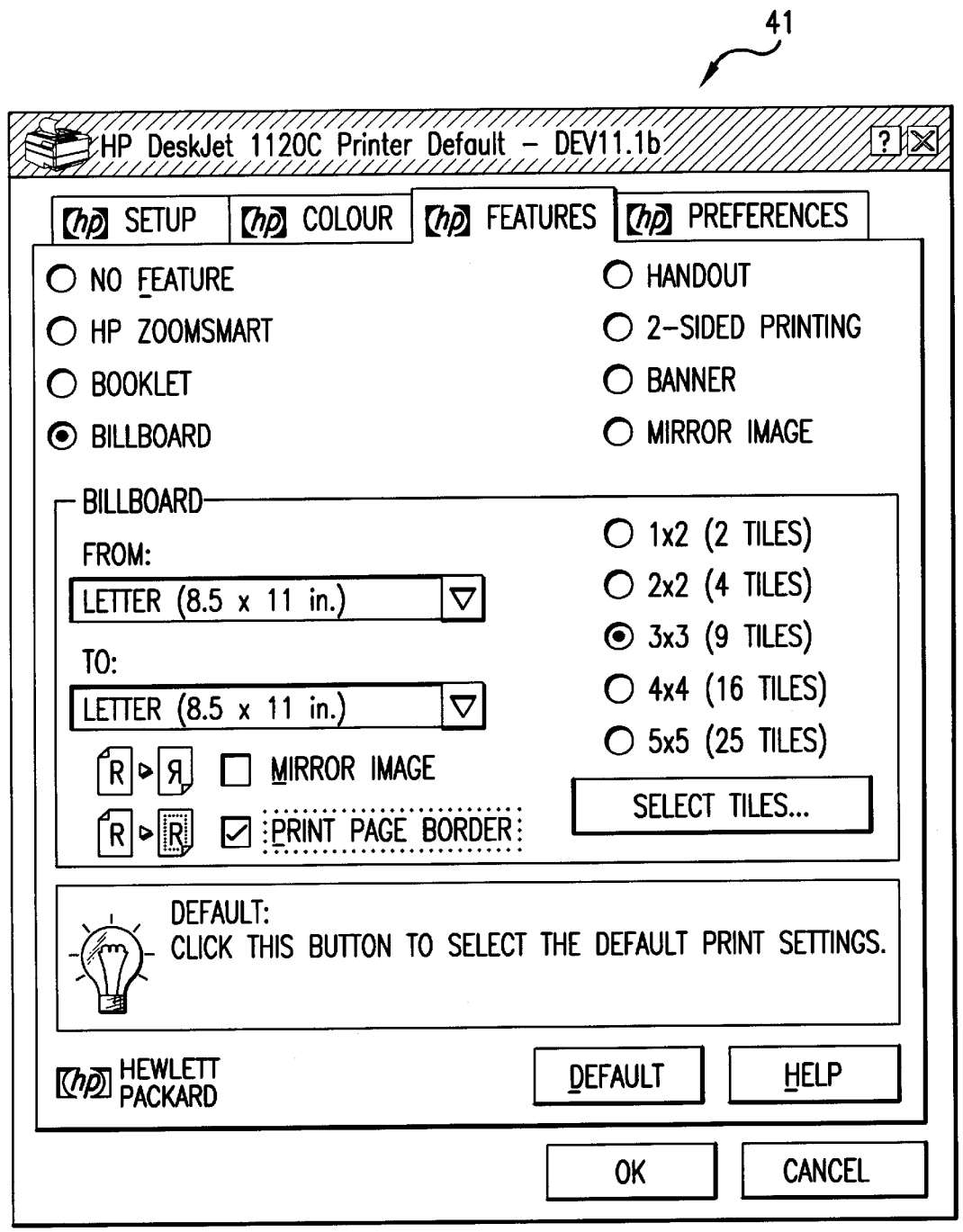
FIG. 4A shows a print setting multi-layered user interface of a printer driver in the system in FIG. 3, with the Billboard 3×3 as the top-most layer.
Figure 4B:
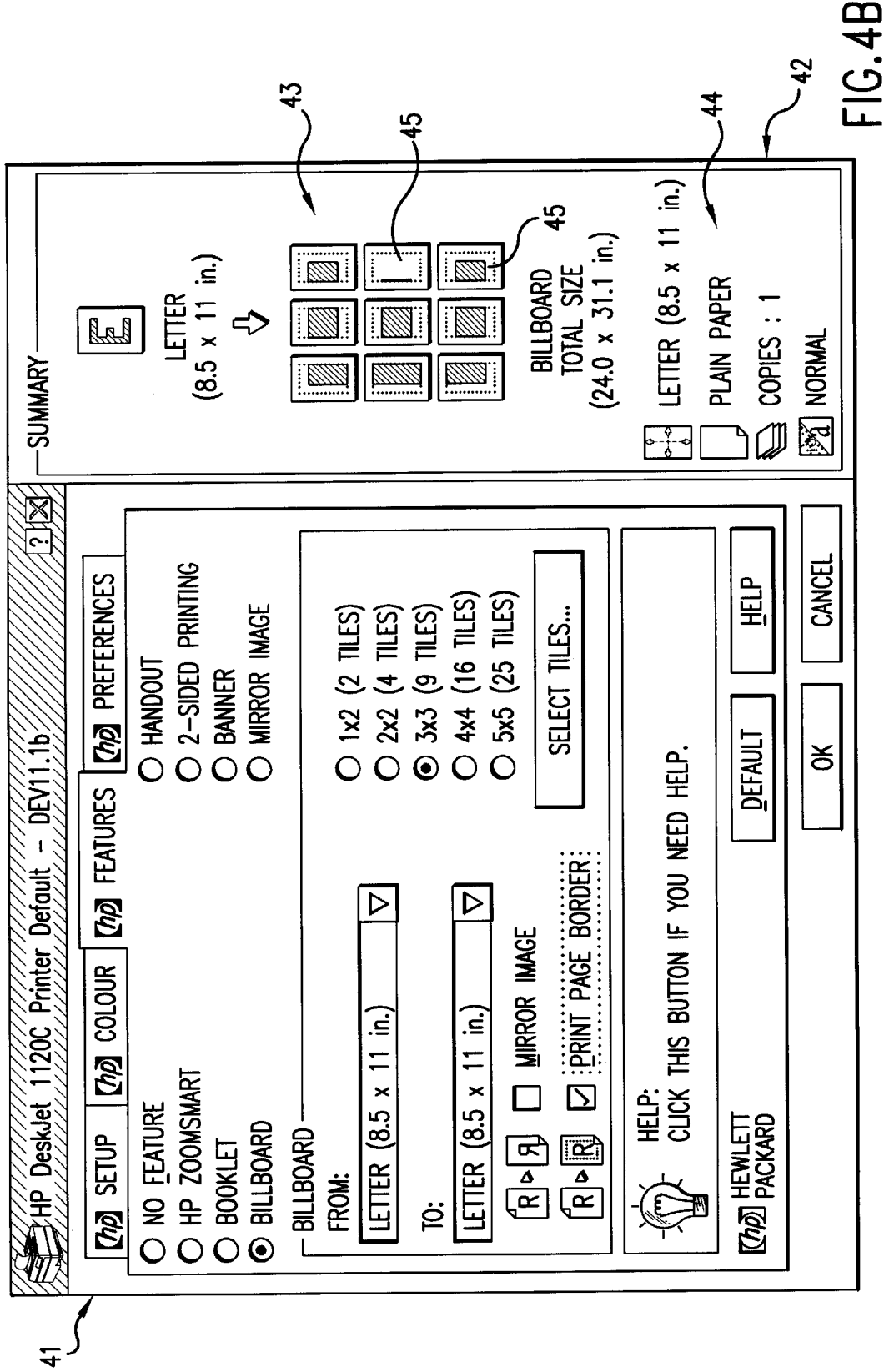
FIG. 4B shows the print setting multi-layered user interface in FIG. 4A juxtaposed with a Summary Bar providing the useful summarized setting information.
Figure 5:
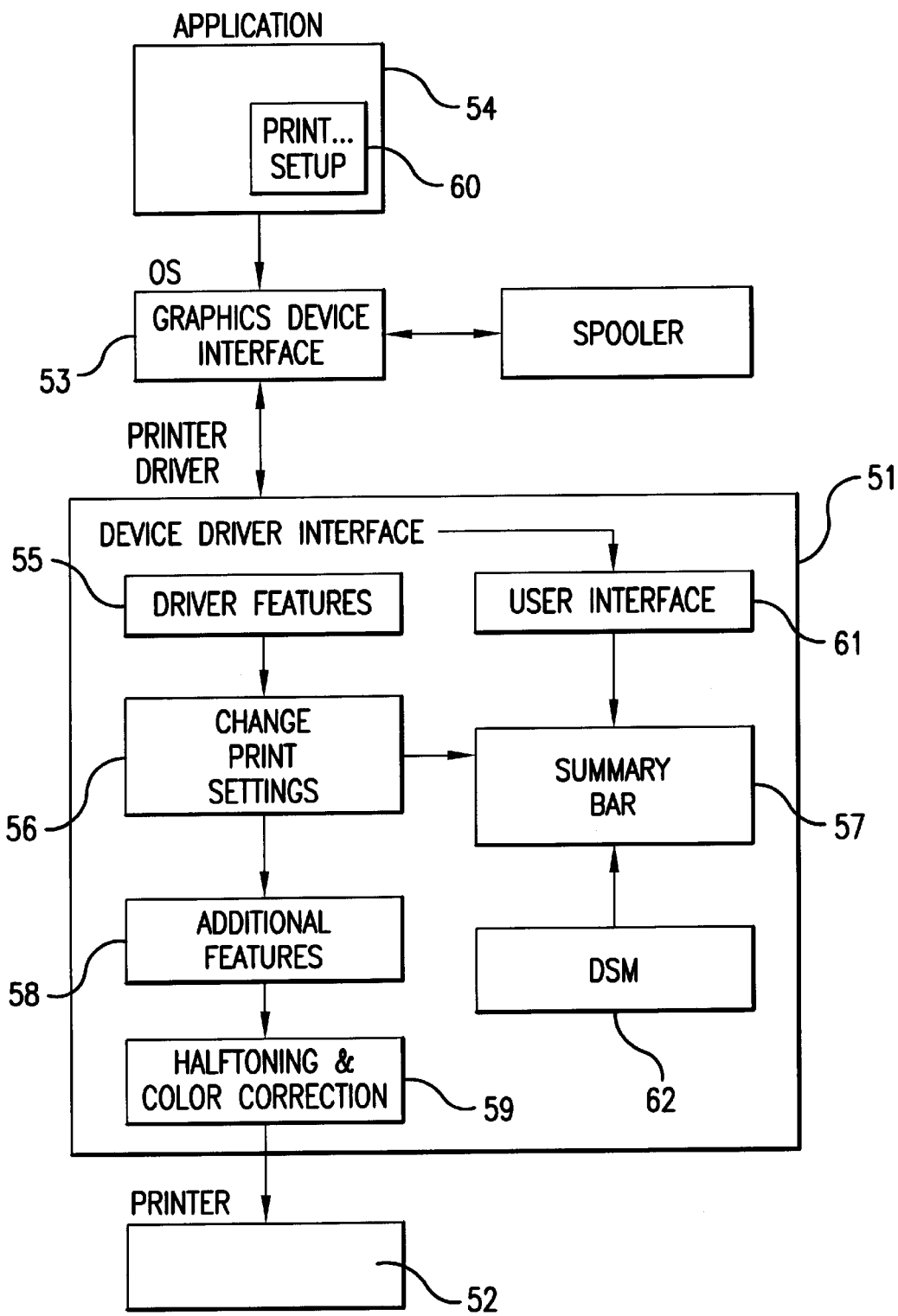
FIG. 5 shows a flow diagram of the system in FIG. 3 detailing the steps of operation with which the system performs to provide the useful summarized setting information.

Reference is first made to FIG. 3, FIG. 4A, FIG. 4B and FIG. 5 to briefly describe a system 31, as shown in FIG. 3, for providing useful summarized setting information according to a preferred embodiment of the invention. The system 31 comprises a memory 32 of a computer (not shown) and a printer driver 51, as shown in FIG. 5. The computer has a display (not shown) and is connected to a printer 52, for example, an inkjet printer, while the printer driver 51 provides a print setting multi-layered user interface (UI) 41, as shown in FIG. 4A. An operating environment is provided by an operating system (OS) 53, for example and not as a limitation, a Windows OS. The memory 32 provides a means for the printer driver 51 to store and retrieve a set of print setting data, which is representative of a previously selected permutation of printer features and setup options. An application program 54 capable of generating a set of printing information, or print job, also has access to the print setting data in the memory 32. When a user initiates a session to perform print setting operations, the printer driver 51 retrieves the print setting data from the memory 32 and presents the print setting multi-layered UI 41 on the display. In addition to processing the print setting data to present the print setting data using the print setting multi-layered UI 41 for the user to make changes, the printer driver 51 also processes the print setting data to provide a summary bar 42 as shown in FIG. 4B. During such processing, the printer driver 51 interprets and reorganizes the print setting data. The printer driver 51 then presents the print setting data as graphical and textual descriptions in the summary bar 42, which are otherwise hidden or too lengthy for the user to comprehend in the form presented in the print setting multi-layered UI 41.

The summary bar 42 is also shown when the printer driver 51 processes the print job from the application program 54 according to the previously selected printer features and setup options permutation for printing at the printer 52. In addition, the summary bar 42 is also shown when the printer 52 is printing the actual printout and the printer driver 51 receives printing status information from the printer 52.

The functional aspect of the system 31 will now be described in more detail with reference to FIG. 3, FIG. 4A and FIG. 4B. As mentioned in the foregoing, the system 31 allows the previously selected printer features and setup options permutation in the print setting multi-layered UI 41 to be shown in the form of the graphics- and text-based summary bar 42 which is juxtaposed with the print setting multi-layered UI 41. By juxtaposing the summary bar 42 with the print setting multi-layered UI 41 on the display, the summary bar 42 is hence visible to the user regardless which layer is top-most in the print setting multi-layered UI 41. In order for the system 31 to function, the print setting data from different layers in the print setting multi-layered UI 41 have to be stored in a common storage location. This common storage location resides in the memory 32 and is partitioned, preferably, as a Printer Device Mode Store 33 in the Windows OS 53, which can then be accessed for retrieval of the print setting data.

The summary bar 42 performs many functions. Firstly, it assists users to visualize the outcome of changes made during print setting operations before the actual print setting is selected, and therefore take effect, as shown in FIG. 4B. For example, a graphical operation within the printer driver 51 generates a graphical preview 43 of the various printing features selected by the user. The combined effect of the user selection is shown as the graphical preview 43 and a textual portion 44, representative of the printer setup options using text and bitmaps, in the summary bar 42 which then allows users to decide on the desired printout before initiating the print job through the application program 54. As the graphical preview 43 is generated almost instantaneously after the user makes a change in print settings, the user receives timely feedback on the effect of the change. This timely feedback assists the user in understanding the results of the selection during the print setting operation, hence resulting in minimal trial and error print operations.

Another example on the visualization of the effect of the print setting selection would be the selection of the special printer feature, Billboard. Without the help of the summary bar 42, the user will have to mentally visualize the joining of various sheets in the desired printout to form the final image of the source document. Considerable effort is required of the user to picture how the sheets of the desired Billboard printout are pieced together, especially when the number of sheets in the Billboard is increased to a large number. However, with the benefit of the graphical operation within the printer driver 51, the summary bar 42 is able to assist the user in this visualization process by assembling a series of tiles 45, representative of the sheets in the desired printout, in the correct order and presenting them to the user on the display.

The summary bar 42 is also used to show the relative effects of a change before and after the print setting changes are made. For example, when printing a source document to a larger printout media size, which involves enlargement of the source document, the summary bar 42 assists the user to visualize the printout size relative to the source document size before enlargement.

Secondly, the summary bar 42 provides a means of confirmation for the print settings previously selected in a print setting multi-layered UI 41. An example would be its use in confirming the print setting in a print setting confirmation dialog in the printer driver 51, which is displayed after the user clicks "OK" to print in the application program 54 to start a print process. For users who have not consciously made any previous print setting selection, the summary bar 42 provides a quick overview of the default print setting before they choose to make changes to the print settings.

Finally, the summary bar 42 is also used as a confirmation of the print setting for a printout being printed. The summary bar 42 facilitates the user to make a decision to allow printing to continue if the print setting is correct, or to cancel printing if the print setting is incorrect.

For a better understanding of the operational aspect of the system 31, a more detailed description of the steps of operation performed by the printer driver 51 when it processes the print job and the print setting data is provided with reference to FIG. 5. In particular, the steps of operation performed by the printer driver 51 to provide the summary bar 42 will also be described in more detail with reference to FIG. 6 and FIG. 7.

As shown in FIG. 5, the application program 54 generates the print job upon initiation by the user and makes printing calls to the Windows OS 53 during a print process. This process of making printing calls is well known to those skilled in the art. The print job of a source document then passes through the Windows OS 53 and is received by the printer driver 51.

Depending on the type of special printer features selected by the user at this point, the print job is reordered into "sheets" of printing information in a Driver Features step 55, a process which is also well known to those skilled in the art. The print setting confirmation dialog then appears in a Change Print Settings step 56. At this point, the printer driver 51 also performs a Summary Bar step 57, which will be described in more details below, thereby presenting the summary bar 42 on the display. When the user has confirmed or is satisfied with the print setting, the printer driver 51 then performs a Rendering step 58, whereby the print job is rasterized, followed by an Imaging step 59, whereby the print job is half-toned and color corrected. The processes of rasterization, half-toning and color correction are all well known to those skilled in the art.

As mentioned above, another way of calling up the Summary Bar step 57 is by performing print setting operation before the user initiates any print process. This print setting operation can be performed when the user is inside the application program 54 in a Print Setup step 60, since the application program 54 also has access to the print setting data in the memory 32. The print setting operation can also be performed independent of the application program 54 in a User Interface step 61.

Alternatively, the Summary Bar step 57 can be called up by the printer driver 51 while it is in a Printer Status Monitor step 62, when the print job has been passed to the printer for making the actual printout.

Figure 6:
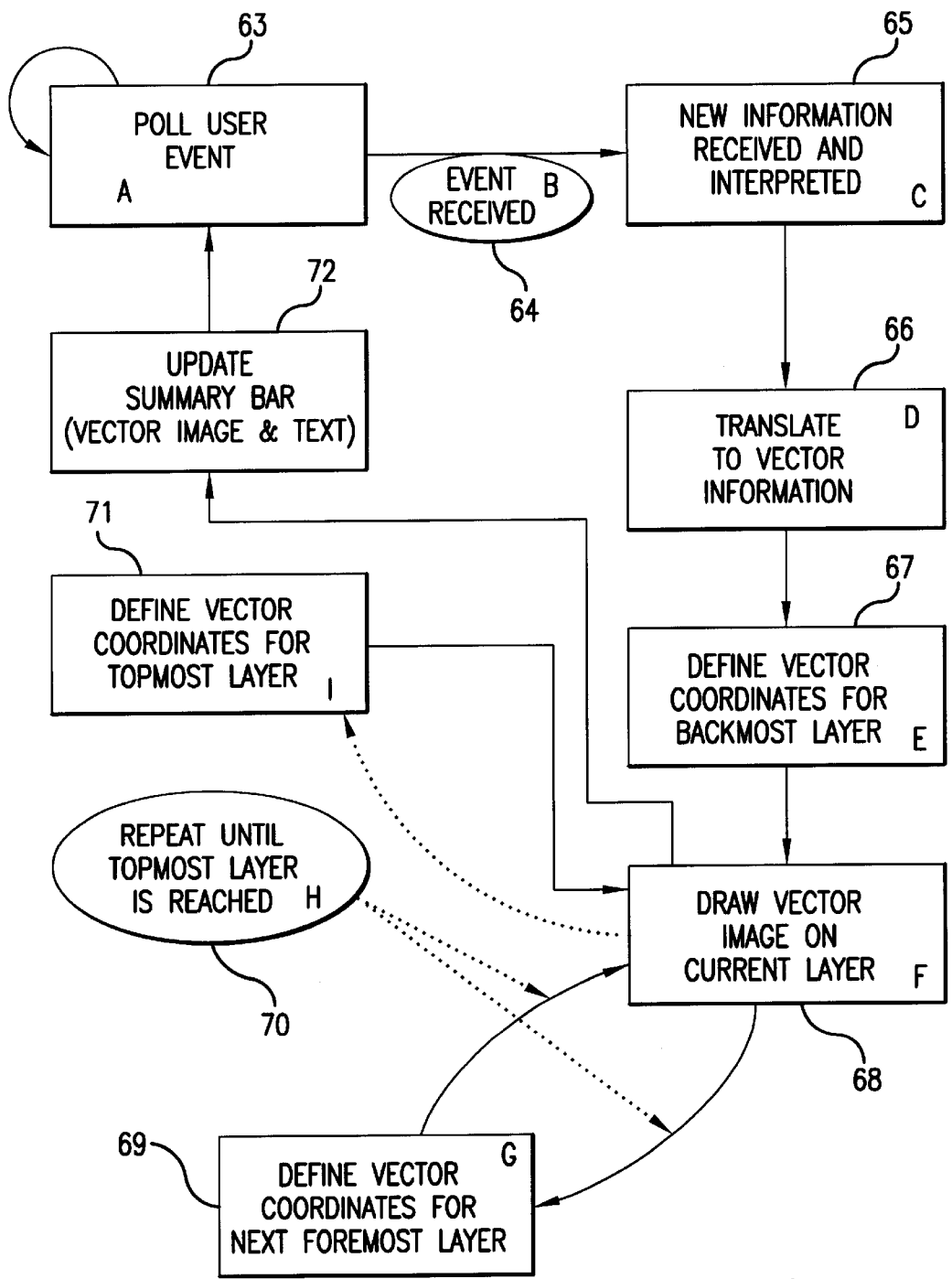
FIG. 6 shows a flow diagram of the Summary Bar step in FIG. 5 detailing the steps of operation with which the Summary Bar performs to provide the useful summarized setting information.
Figure 7:
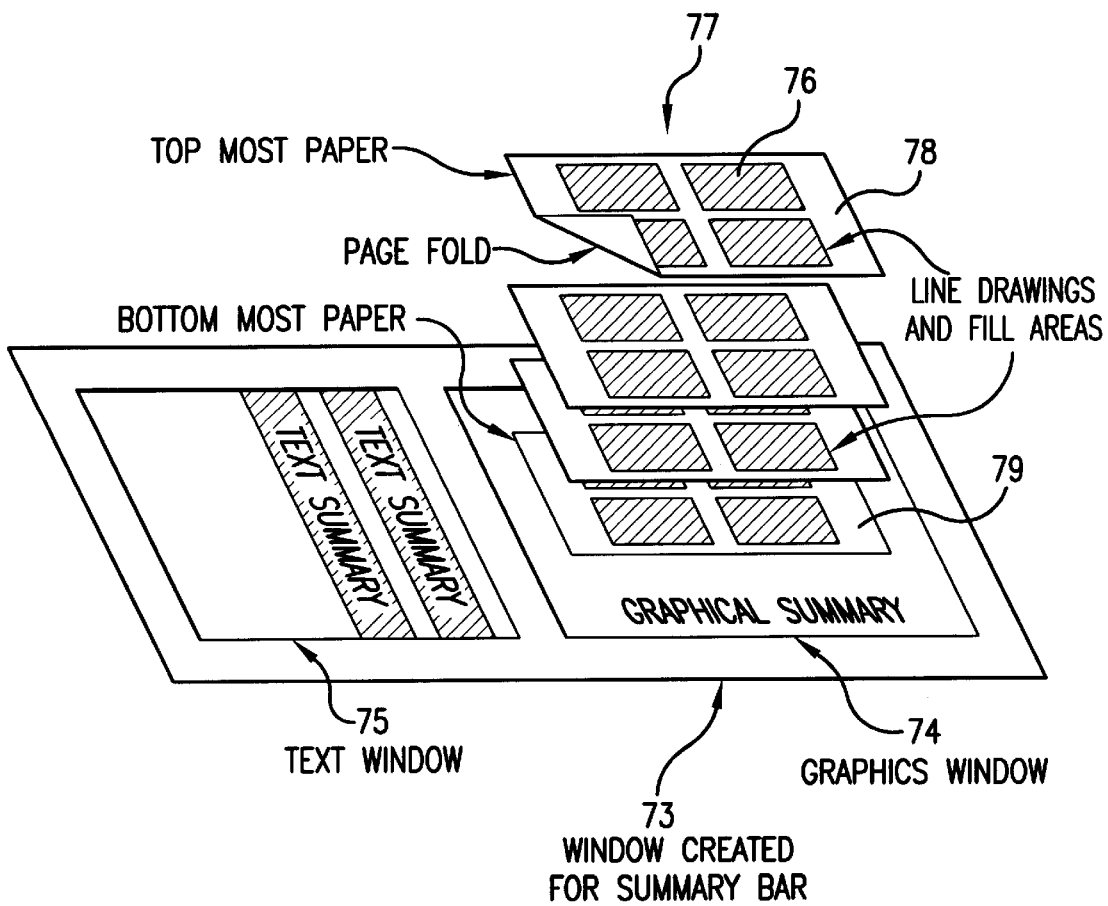
FIG. 7 shows a conceptual exploded view of the Summary Bar in FIG. 4B drawn using the steps shown in FIG. 6.

Reference is now made to FIG. 6 and FIG. 7 to describe in more detail the operation within the Summary Bar step 57. The user must first provide input to the Windows OS 53 via the keyboard or mouse, and keyboard strokes, mouse movements, or mouse clicks as such are called events. For the summary bar 42 to respond to any kind of user input, it then has to poll for such events in a Poll User Event step 63. During input, the user can select the printer features and setup options from any dialog box in the print setting multi-layered UI 41, and the mouse clicks in any of the dialog boxes in a multi-layered user interface will be accepted as a new event.

When a user-input is received, for example, a mouse click, the printer driver 51 enters an Event Received condition 64. This input usually indicates that a selection has been made, for example, the user selects the U.S. Letter size as the default media size to use, or the user selects a printing feature which puts two pages of a source document onto one sheet of printout media. Any change in selections at the print setting multi-layered UI 41 will be stored in the storage location, namely the Printer Device Mode Store 33 in memory 32. After storing the changed print setting data, the printer driver 51 retrieves this print setting data from the memory 32, in a New Information Received and Interpreted step 65, and interprets the print setting data.

The interpretation of the print setting data is done so that the print setting data can be presented to the user in both a graphical as well as a textual form. For the print setting data to be presented in a graphical form, it has to be reorganized in a Translate To Vector Information step 66 so that it can be represented as drawings consisting of a series of interconnected lines and filled areas. The representation of the print setting data in this form is called "vector" form as it conveys a sense of magnitude and direction. Print setting data that is to be presented in textual form to the user is used to select the correct text from a list of text stored in a pre-defined location in the memory 32.

Before any drawing takes place, a process that is well known to those skilled in the art, a window 73, as shown in FIG. 7, has to be created into which all graphical and textual representations will be drawn. The window has to be subdivided into distinct areas, a graphics window 74 and a text window 75, for displaying the graphical as well as the textual form of the print setting data to be represented respectively.

An area in the memory 32 is used as an "invisible canvas" for drawing in graphical form. This reduces any flicker that may arise when drawing to the display directly which is visible to the user.

In order to show "printed content" 76 on "sheets of paper" 77 that are below a top-most paper 78 in graphical form in a "layered" approach, the line drawings are drawn first on the bottom-most paper 79 in graphical form. The printer driver 51 defines the boundaries in within which the line drawings and fill areas are to be drawn in a Define Vector Coordinates For Bottom-most Layer step 67. Once the bottom-most paper 79 and its printer content 76 are drawn in a Draw Vector Image on Current Layer step 68, the printer driver 51 proceeds to make the next foremost sheet of paper 77 in graphical form.

The boundaries within which the line drawings and fill areas are to be drawn for the next foremost sheet of paper 77 are defined in a Define Vector Coordinates For Next Foremost Layer step 69. The line drawings and fill areas which are to be drawn on the next foremost sheet of paper 77 are then drawn within the boundaries defined in the Draw Vector Image on Current Layer step 68. When this is done, the printer driver 51 proceeds to draw the next foremost sheet of paper 77 lying on top of the sheet of paper 77 just drawn.

This layered process of progressively drawing each sheet of paper 77 complete with the line drawings and fill areas is repeated until all sheets of paper 77 from the bottom to the top of the paper stack is drawn, while the printer driver 51 is in a Repeat Until Top-most Layer Is Reached condition 70.

When the boundaries of the top-most paper 78 within which the line drawings and fill areas are to be drawn are defined, an account has to be taken if the bottom-right edge of the top-most paper 78 will be folded. The folding is needed to show the printed content 76 on the reverse side of the top-most paper 78 as well as partial printed content 76 on the next sheet of paper 77 beneath the top-most paper 78. If a fold is required, then new boundaries have to be defined to accommodate the page fold in a Define Vector Coordinates For Top-most Layer step 71. All line drawings and fill areas on the top-most paper 78 are drawn within the new boundaries and any line drawings or fill areas drawn outside the given boundaries are made invisible to the user. This prevents the partial printed content 76 on the next paper 77 beneath the top-most paper 78 from being hidden.

After all line drawings and fill areas have been drawn into the area in memory 32 used as an invisible canvas, the content of the memory area is transferred to the graphics window 74 which was created earlier for showing the graphical form. If the information to be shown to the user is in textual form, the text to be shown is drawn in the text window 75 that was created earlier for showing the textual form.

When the graphical and textual forms have been drawn in their respective windows in an Update Summary Bar step 72, the invention returns to the Poll User Event step 63 and polls for new user inputs.

Figure 8:
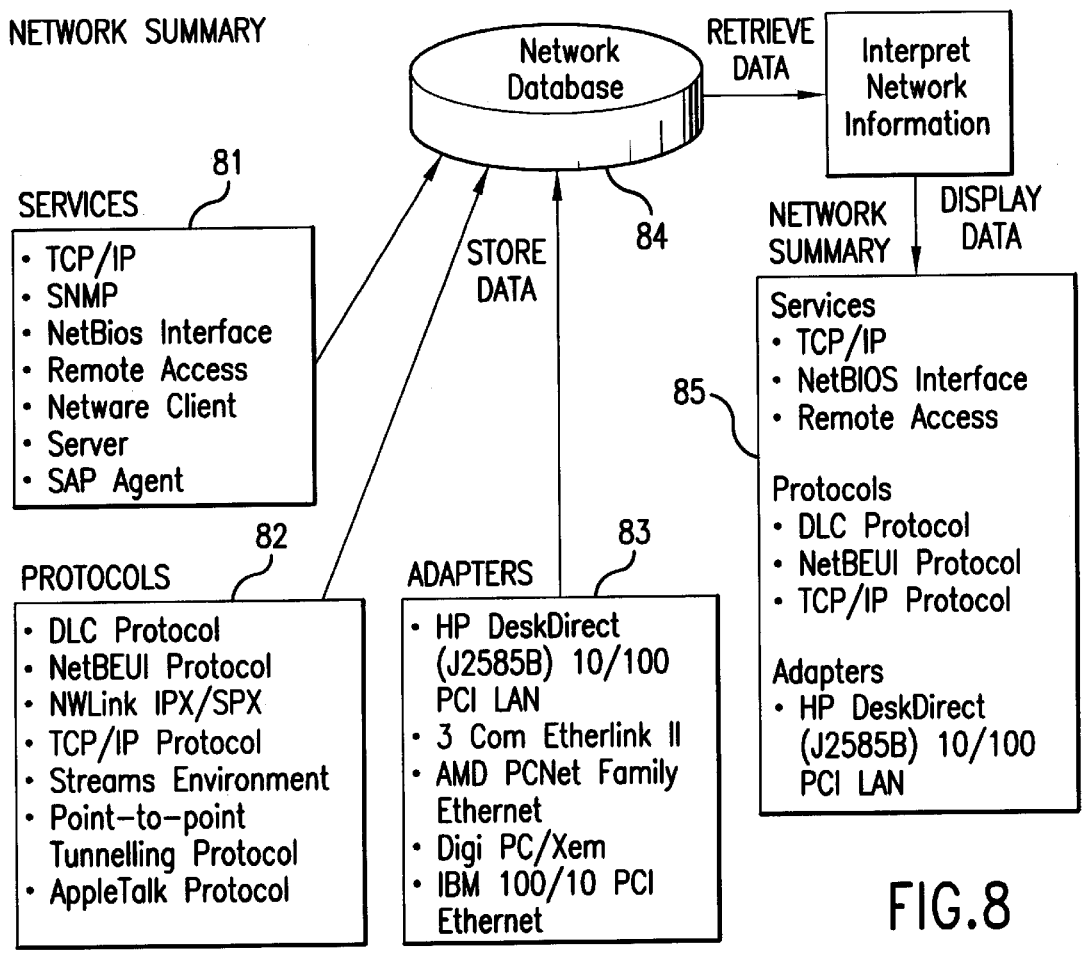
FIG. 8 shows a block diagram of a system for providing a user with useful summarized setting information for a multi-layered user interface according to a second embodiment of the invention.
Figure 9:
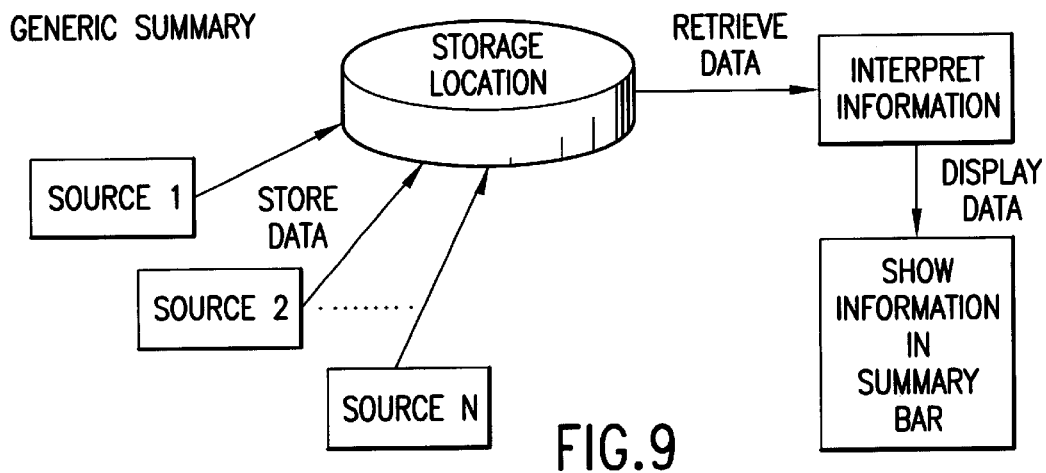
FIG. 9 shows a block diagram of a system for providing a user with useful summarized setting information for multiple multi-layered user interface according to a third embodiment of the invention.

Reference is now made to FIG. 8 and FIG. 9 to describe alternative embodiments of the present invention. The system for providing useful summarized setting information can also be enabled for any multi-layered UI for performing other types of setting operation whereby the various features and setup options are dispersed among the various dialog boxes and tabs. As an example in FIG. 8, a Network setting multi-layer UI stores its features and setup options from a Services tab 81, a Protocols tab 82 and an Adapters tab 83 in a Network Database 84. The Network setting information stored in the Network Database 84 is then retrieved and interpreted for presentation in a Network Summary window 85 on the display.

As shown in FIG. 9, the information stored in the common storage location is not restricted to a single multi-layered UI as the source but can also be generated from multiple multi-layered UIs. In the grand scheme of things, a summary of these multiple multi-layered UIs enables the user to obtain a broad overview of the various setting selections made. Thus, the display of such a summary allows the user to view at a glance the various settings which have been selected by the user without searching through the multiple layers in each multi-layered UI for a specific setting which was previously set.

We claim:

1. A method for presenting useful summarized setting information from at least one multi-layered user interface enabled with multiple-setting functionality on a display of a computing system to a user, the computing system having an operating system, a memory and a plurality of application programs, and each layer of the at least one multi-layered user interface having at least one setting functionality, comprising the steps of:

enabling at least one of the plurality of application programs with functionality to activate the at least one multi-layered user interface to provide the multiple-setting functionality;

storing a set of information about the multiple-setting functionality in the memory for subsequent updating by the at least one multi-layered user interface;

after storing the set of information, accessing the set of information about the multiple-setting functionality from the memory;

after accessing the set of information from the memory, interpreting the set of information;

after accessing the set of information from the memory, reorganizing the set of information;

after interpreting and reorganizing the set of information, presenting summarized information using the interpreted and reorganized set of information about the multiple-setting functionality provided by the at least one multiple-layered user interface on the display to the user.

2. The method as in claim 1, further comprising the step of:

activating the at least one multi-layered user interface from the at least one of the plurality of application programs to perform multiple-setting function.

3. The method as in claim 2, further comprising the step of:

after activating the multi-layered user interface, accepting setting input from the user through the at least one multiple-layered user interface.

4. The method as in claim 3, further comprising the step of:

after accepting setting input from the user, re-storing the set of information about the multiple-setting functionality in the memory for subsequent updating by the at least one multi-layered user interface.

5. The method as in claim 1, wherein the step of presenting summarized information further includes the step of:
   presenting selective information about the at least one setting functionality in each layer of the at least one multiple-layered user interface on the display to the user.

6. The method as in claim 4, wherein the step of presenting summarized information further includes the step of:
   juxtaposing the summarized information with the activated at least one multi-layered user interface.

7. The method as in claim 1, wherein the step of presenting summarized information further includes the step of:
   presenting summarized information about the multiple-setting functionality provided by the at least one multiple-layered user interface on the display to the user using graphical representations.

8. The method as in claim 7, wherein the step of presenting summarized information using graphical representations further includes the step of:
   presenting summarized information about the multiple-setting functionality provided by the at least one multiple-layered user interface on the display to the user using graphical representations which are drawn using a vectored approach.

9. The method as in claim 7, wherein the step of presenting summarized information using graphical representations further includes the step of:
   presenting summarized information about the multiple-setting functionality provided by the at least one multiple-layered user interface on the display to the user using graphical representations which are drawn using a layered approach.

10. The method as in claim 1, wherein the step of presenting summarized information further includes the step of:
    presenting summarized information about the multiple-setting functionality provided by the at least one multiple-layered user interface on the display to the user using textual representations.

11. A system for presenting useful summarized setting information from at least one multi-layered user interface enabled with multiple-setting functionality on a display of a computer to a user, the computer having an operating system, a memory and a plurality of application programs, and each layer of the at least one multi-layered user interface having at least one setting functionality, the system comprising:
    means for enabling at least one of the plurality of application programs with functionality to activate the at least one multi-layered user interface to provide the multiple-setting functionality;
    means for storing a set of information about the multiple-setting functionality in the memory for subsequent updating by the at least one multi-layered user interface;
    means for accessing the stored set of information about the multiple-setting functionality from the memory;
    means for interpreting the accessed set of information;
    means for reorganizing the accessed set of information;
    means for presenting summarized information using the interpreted and reorganized set of information about the multiple-setting functionality provided by the at least one multiple-layered user interface on the display to the user.

12. The method as in claim 11, further comprising means for activating the at least one multi-layered user interface from the at least one of the plurality of application programs to perform multiple-setting function.

13. The method as in claim 12, further comprising means for accepting setting input from the user through the activated at least one multiple-layered user interface.

14. The method as in claim 13, further comprising means for re-storing the set of information about the multiple-setting functionality in the memory for subsequent updating by the at least one multi-layered user interface.

15. The method as in claim 11, wherein the means for presenting summarized information further includes means for presenting selective information about the at least one setting functionality in each layer of the at least one multiple-layered user interface on the display to the user.

16. The method as in claim 14, wherein the means for presenting summarized information further includes means for juxtaposing the summarized information with the activated at least one multi-layered user interface.

17. The method as in claim 11, wherein the means for presenting summarized information further includes means for presenting summarized information about the multiple-setting functionality provided by the at least one multiple-layered user interface on the display to the user using graphical representations.

18. The method as in claim 17, wherein the means for presenting summarized information using graphical representations further includes means for presenting summarized information about the multiple-setting functionality provided by the at least one multiple-layered user interface on the display to the user using graphical representations which are drawn using a vectored approach.

19. The method as in claim 17, wherein the means for presenting summarized information using graphical representations further includes the means for presenting summarized information about the multiple-setting functionality provided by the at least one multiple-layered user interface on the display to the user using graphical representations which are drawn using a layered approach.

20. The method as in claim 11, wherein the means for presenting summarized information further includes means for presenting summarized information about the multiple-setting functionality provided by the at least one multiple-layered user interface on the display to the user using textual representations.

* * * * *